United States Patent [19]
Ruegg

[11] 3,977,661

[45] Aug. 31, 1976

[54] INJECTION MOLD LOCKING DEVICE AND TURNTABLE

[75] Inventor: Edwin Ruegg, Netstal, Switzerland

[73] Assignee: Maschinenfabrik u. Giesserei Netstal AG, Switzerland

[22] Filed: Jan. 14, 1976

[21] Appl. No.: 648,893

Related U.S. Application Data

[63] Continuation of Ser. No. 476,949, June 6, 1974, abandoned.

[30] Foreign Application Priority Data
June 13, 1973 Switzerland.......................... 8566/73

[52] U.S. Cl................................ 269/57; 425/246; 425/451
[51] Int. Cl.².......................................... B29F 1/00
[58] Field of Search............ 425/246, 451; 164/303, 164/343; 108/20; 74/16; 269/56, 57, 74

[56] References Cited
UNITED STATES PATENTS

| | | | |
|---|---|---|---|
| 3,574,894 | 4/1971 | Aoki | 425/246 |
| 3,806,296 | 4/1974 | Aoki | 425/246 |

FOREIGN PATENTS OR APPLICATIONS

| | | | |
|---|---|---|---|
| 1,211,792 | 3/1966 | Germany | 425/246 |
| 2,105,331 | 8/1972 | Germany | 425/246 |
| 7,459 | 3/1968 | Japan | 425/246 |

*Primary Examiner*—Robert D. Baldwin
*Attorney, Agent, or Firm*—McGlew and Tuttle

[57] ABSTRACT

The machine is designed particularly for molding plastics and includes two mold locking units, each having a stationary yoke and a mobile yoke, associated with a turntable used for transporting an open mold between first and second working stations. The turntable is mounted for rotation about an axis parallel to the direction of operation of the mold locking units and between the stationary and mobile yokes, to extend between the working stations. A rotary piston drive is mounted on a stationary yoke coaxially with the turntable axis to rotate the turntable. A spring is provided to exert a lifting effect on the turntable to provide a slight clearance between the turntable and the stationary yokes, and a hydraulic pressure mechanism acts coaxially of the turntable in opposition to the spring so that, when supplied with pressure, the turntable is forced against the lower or stationary yokes. At least one of the working stations has locations for two injection units which operate in directions at right angles to each other.

9 Claims, 4 Drawing Figures

INJECTION MOLD LOCKING DEVICE AND TURNTABLE

This is a continuation of application Ser. No. 476,949 filed June 6, 1974, now abandoned.

FIELD AND BACKGROUND OF THE INVENTION

This invention relates to injection molding machines, particularly for plastics, and more particularly to injection molding machines of the type having at least one mold locking unit with which there is associated a turntable for transporting an open mold between first and second working stations.

With machines of this type, injection molding of, for example, two different plastics, or of moldings with embedded inserts, can be carried out at two different working stations. In the known constructions, however, the arrangement and drive of the turntable is generally complicated and expensive in construction, and requires a great deal of space.

SUMMARY OF THE INVENTION

In contrast to the known injection molding machines of this type, the present invention is directed to an injection molding machine of the same type but which permits a maximum utilization of the two working stations and occupies a minimum space, and by means of which two-color moldings and moldings with embedded inserts can be formed, the mold locking can act in both the vertical and horizontal directions, and the operation can be controlled automatically.

For this purpose, the injection molding machine of the present invention is characterized by a turntable which is rotatable about an axis parallel to the operational direction of the mold locking unit, and which is disposed between a stationary yoke and a mobile yoke, and extends between the working stations. The turntable is rotatable by a rotary piston drive which is coaxial with the table axis and which is mounted on that side of the stationary yoke which is remote from the table. A hydraulic pressure mechanism is provided at the side of the table facing the mobile yoke, and is selectively operable to temporarily press the turntable against the stationary yoke, this hydraulic pressure mechanism acting axially of the table against the bias of a spring tending to lift the table to provide a clearance with the stationary yoke. At least one of the working stations has locations for mounting injection units operating at right angles to each other.

Due to the coaxial mounting of the rotary drive and the pressure mechanism for the turntable, whose axis of rotation is parallel to the direction of operation of the mold locking unit and advantageously symmetrically situated between the two working stations, an extremely compact design, with an optimized force transmission, is made possible, independently of whether the operational direction of the mold locking unit, and thus the axis of the turntable, is oriented horizontally or vertically. At the same time, a mold locking unit, also having two injection units operating at right angles to each other, may be provided at the second working station whereby, due to the complete symmetry of the device with respect to the axis of the turntable, an optimum utilization in the smallest space is assured.

An object of the invention is to provide an improved injection molding machine, particularly for plastics, of the type having at least one mold locking unit associated with a turntable for transporting an open mold between first and second working stations.

Another object of this invention is to provide such an injection molding machine having an extremely compact design with an optimized force transmission.

A further object of the invention is to provide such an injection molding machine in which the axis of rotation of the turntable is parallel to the direction of operation of the mold locking unit, and the axis and the direction of operation may be oriented either horizontally or vertically.

For an understanding of the principles of the invention, reference is made to the following description of typical embodiments thereof as illustrated in the accompanying drawings.

DESCRIPTION OF THE PREFERRED EMBODIMENTS

Figure 1:
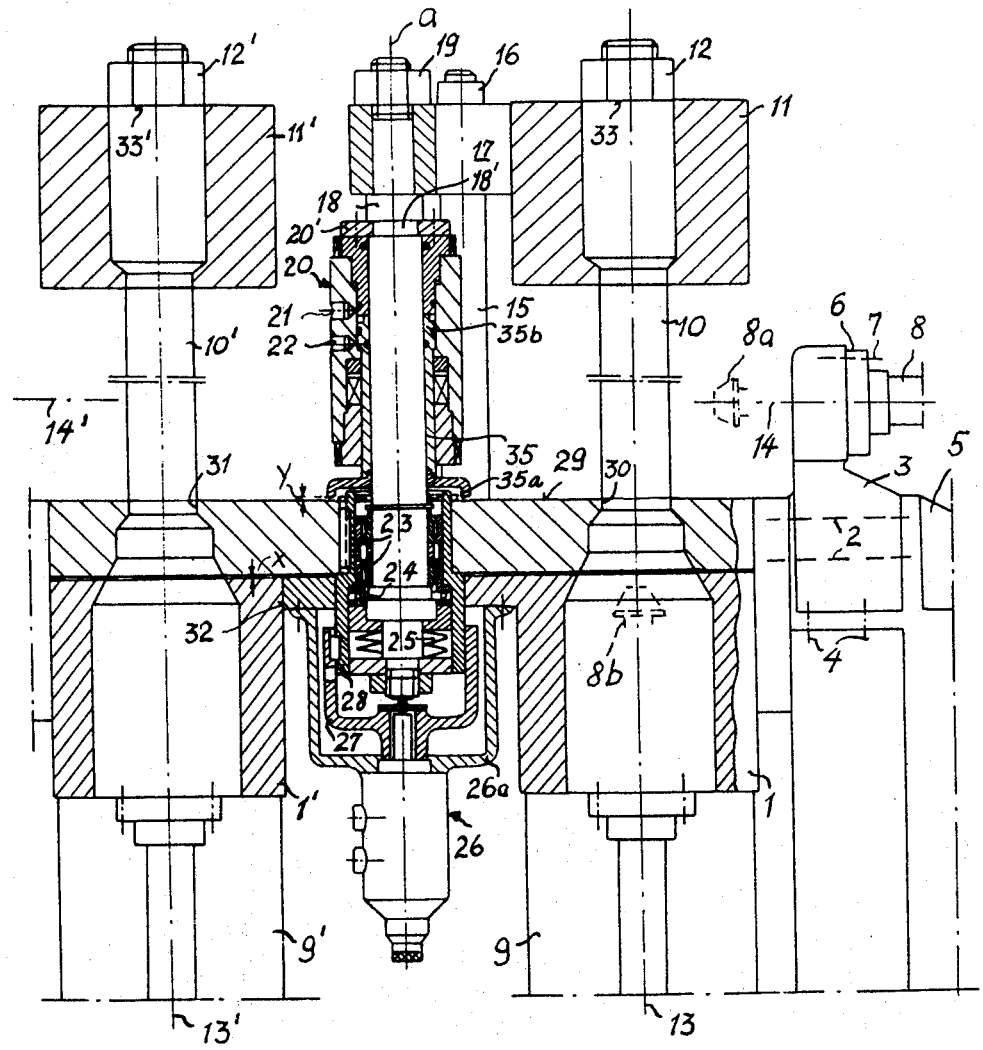
FIG. 1 is a vertical sectional view of an injection molding machine having a horizontal turntable.
Figure 2:
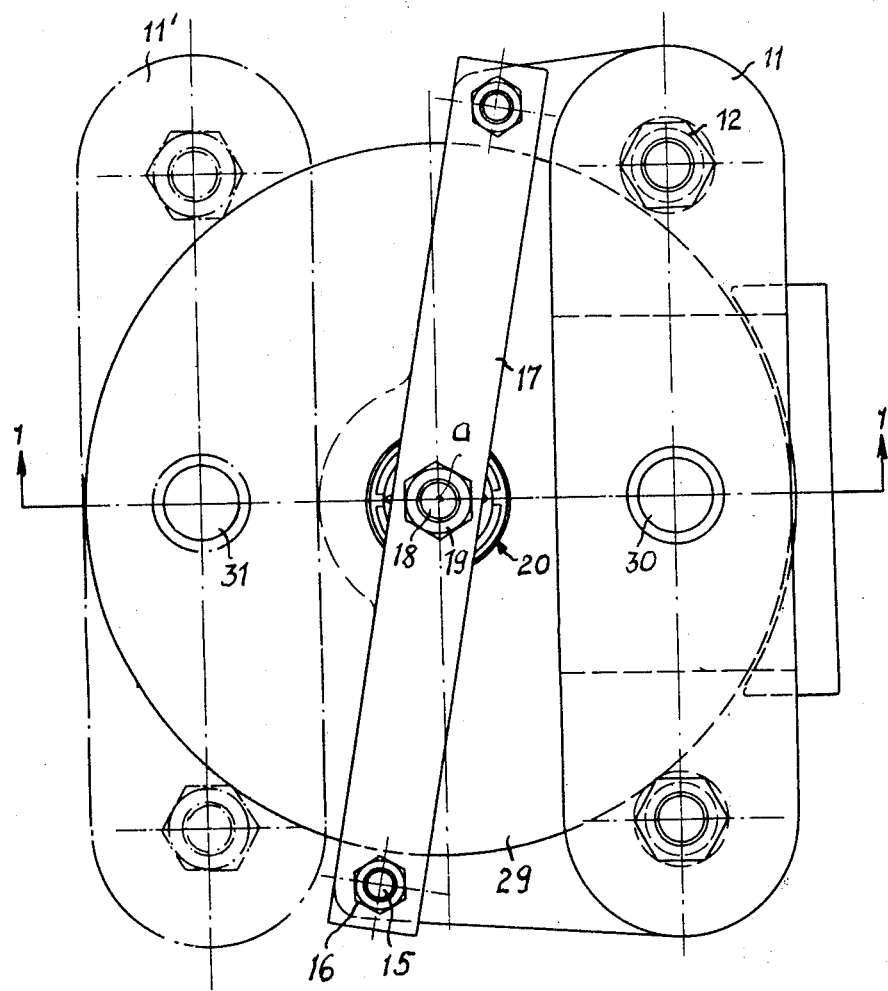
FIG. 2 is a top plan view corresponding to FIG. 1.
Figure 3:
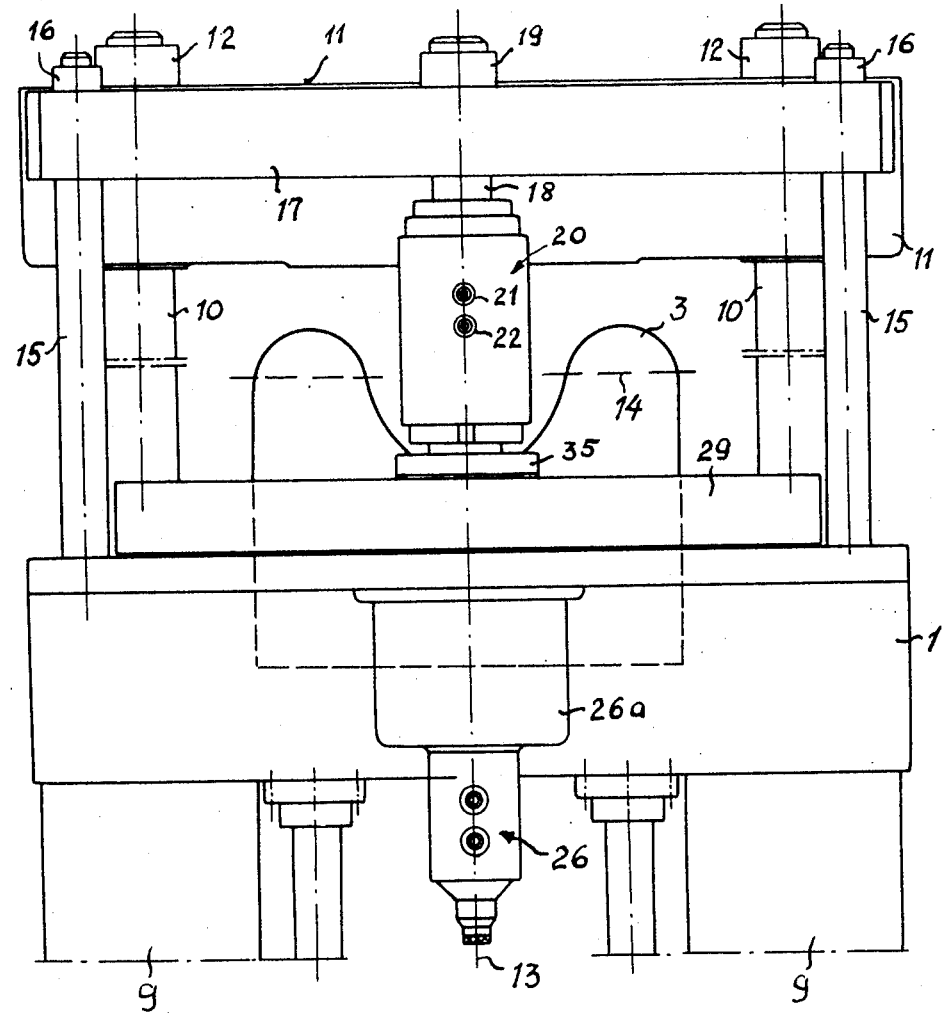
FIG. 3 is a side elevational view corresponding to FIG. 1, but turned through 90°, the frontal mold locking unit being omitted for reasons of clarity.

The plastics injection molding machine shown in FIGS. 1 to 3 comprises two stationary backing yokes 1 and 1' having a horizontal backing surface and disposed symmetrically of a vertical central axis $a$. The backing yoke 1, shown in FIG. 1 on the righthand side, is secured, by means of screws 2, to a supporting body 3 which, in its turn, is secured to the column 5 of the machine by means of screws 4. By means of flanges 6 and screws 7, body 3 supports the guide rods 8 of an injection unit (indicated at 8a) whose injection axis is situated in the mold parting plane 14. The mold locking device comprises two hydraulic locking units 9, 9' disposed symmetrically of the mold locking axis 13, including cylinders at the bottom side and piston rods 10 which extend upwardly and are secured by means of nuts 12 to a mobile yoke 11. As indicated at 8b, it is also possible to provide a vertically disposed injection unit whose injection axis coincides with mold closing axis 13. Two vertically upwardly extending rods 15 are fixed in backing yoke 1 and have their upper ends anchored, by nuts 16, to a crossbar 17. A rotation shaft 18, coaxial with the axis of symmetry $a$ passing through the center of crossbar 17, is fixed to the crossbar by means of a nut 19, and a hydraulic pressure mechanism 20 for a rotatable turntable 29, which is vertically movable within limits, is mounted on shaft 18 above backing yokes 1 and 1'. Pressure mechanism 20 is secured to shaft 18 by a collar 20', screwed or bolted to mechanism 20, and engaged in a peripheral groove 18' in shaft 18. Turntable 29 is mounted on shaft 18 by means of a radial bearing 23 and an end thrust bearing 24, and is biased, for lifting away from backing yokes 1 and 1', by a spring 25 engaging the lower end of shaft 18. The hydraulic connections of pressure mechanism 20 are indicated at 21 and 22, and the piston thereof is indicated at 35. Piston 35 has an outwardly projecting skirt 35a secured to its lower end and spaced by a short distance $y$ from the upper surface of turntable 29. Adjacent its upper end, piston 35 has a peripheral enlargement 35b which provides an upper chamber communicating with the hydraulic connection 21 and a lower chamber, beneath annular rib 35b, communicating with the hydraulic connection 22.

Bearings 23 and 24 are located in a bearing bush 28 fixed for rotation with turntable 29 and coupled with a drive bell 27 at the underside of turntable 29. Drive bell 27 is carried on the upper end of a shaft of a hydraulic rotary-piston motor 26 secured to the underside of backing yoke 1 through the medium of a housing flange 26a and screws. Turntable 29 is provided with two centering openings 30 and 31 which are symmetrical relative to axis a. It should be noted that turntable 29 is capable of limited axial displacement relative to shaft 18.

As may be seen in the drawing, the embodiment of the invention shown in FIGS. 1, 2 and 3 comprises two mold locking units 1, 9, 10, 11 and 1', 9', 10' and 11' disposed symmetrically of axis a, and injection units, injecting in mold parting plane 14, 14' or in mold locking axes 13, 13', may be mounted on backing yokes 1, 1' by means of supporting bodies which have not been shown. Mobile yokes 11 extend substantially parallel to each other, as indicated more particularly in FIG. 2.

The described injection molding machine may be operated in the following manner. Assume, for example, that there is to be manufactured a molding using an embedded insert. First, with the mold open and with turntable 29 elevated by the distance x from backing yoke 1 by means of spring 25, and with centering openings 30 or 31 aligned with axis 13 or axis 13', and with a small play y between the skirt 35a of pressure piston 35 and turntable 29, the insert is placed in the mold in centering opening 31. Thereupon, turntable 29 is turned through 180° by means of rotary-piston motor 26. After this angular displacement, turntable 29 is pressed against backing yoke 1 by supplying hydraulic fluid under pressure to hydraulic connection 21 of hydraulic pressure mechanism 20, to exert pressure against the upper surface of the rib 35b of piston 35. This moves turntable 29 downwardly against the bias of spring 25 and, after the turntable has engaged stationary backing yoke 1, the mold is closed by actuating locking units 9 to lower yoke 11.

At this point, and by means of one or the other of the injection units, for example in the mold locking axis 13 or in the mold parting plane 14, plastic can be injected into the mold. As soon as the plastic has cooled down, the mold is opened by operating locking units 9 to re-elevate yoke 11 into its initial position. Subsequently, hydraulic connection 21 of pressure mechanism 20 is connected to exhaust and hydraulic pressure may be admitted, through hydraulic connection 22, beneath rib 35b of piston 35. This relieves the downward pressure against turntable 29, and spring 25 elevates turntable 29 from backing yoke 1. Thereafter, turntable 29 may be turned again through 180° and the molding is then ejected from the open mold.

In many cases, it is desirable to make a molding of two different plastics, for example, of different colors. In such a case, the injection molding can be carried out in the described machine in both of the working stations indicated by the mold-locking axes 13 and 13'. For example, after the injection above first backing yoke 1 and subsequent turning of table 29 through 180°, the turntable 29 is pressed against backing yoke 1' by means of pressure mechanism 20 and the mold is then closed by operating locking mechanisms 9' to lower yoke 11'. The injection molding can now be carried out with the second plastic, in either mold locking axis 13' or mold parting plane 14'. After the cooling of the molding, the mold is opened by operating locking mechanisms 9' to elevate yoke 11' and turntable 29 is elevated from backing yoke 1', by relieving the pressure mechanism 20, under the bias of spring 25. The finished molding is then ejected from the open mold by an ejector and turntable 29 is turned back through 180° into its initial position. In practice, a control device is provided automatically controlling the whole cycle of the different working or moving operations.

Figure 4:
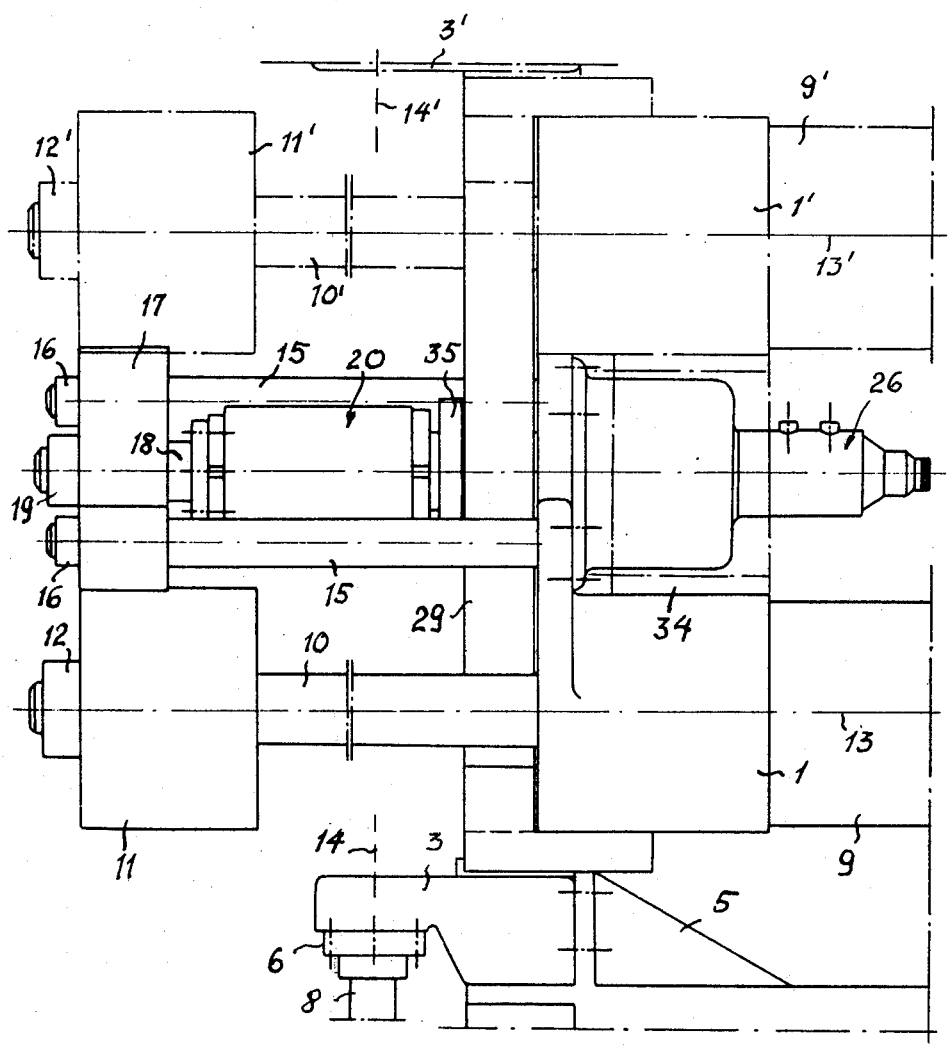
FIG. 4 is a side elevational view of an injection molding machine having a vertical turntable.

As shown in FIG. 4, the principle of the described machine can also be applied to an injection molding machine comprising mold locking units having a horizontal axis. In this machine which, otherwise, is designed in the same manner as the machine shown in FIGS. 1 to 3, the upper one of the two mold locking units 9', disposed with horizontal axes one above the other, is supported by the lower unit 9 by means of a supporting element 34 located therebetween.

Both described machines permit rapid working cycles. Thus, all operations are performed in fully hydraulic ways and, due to a largely symmetrical disposition of the elements, a constructionally compact machine is obtained. By providing a slightly oblique position of crossbar 17, as may be seen in FIG. 2, and the thereby obtained exposure of the mold part in an angle of 90° relative to the pressure injection position, a turning of the table through only 90° is also made possible and may be effected by a corresponding adjustment operation of rotary-piston motor 26.

While specific embodiments of the invention have been shown and described in detail to illustrate the application of the principles of the invention, it will be understood that the invention may be embodied otherwise without departing from such principles.

What is claimed is:

1. In an injection mold locking device of the type having at least one mold locking unit, including a stationary yoke and an opposed mobile yoke, associated with a turntable for transporting an open mold between first and second working stations, the improvement comprising, in combination, means mounting said turntable for rotation about an axis parallel to the direction of operation of said mold locking unit and between said stationary and mobile yokes, to extend between said working stations; driving means operable to rotate said turntable; a hydraulic pressure mechanism mounted to act coaxially of said turntable on that side of said turntable facing said mobile yoke and operable to selectively press said turntable against said stationary yoke; spring means mounted to act coaxially of said turntable in opposition to said hydraulic pressure mechanism and adapted to elevate said turntable from said stationary yoke when said hydraulic pressure mechanism is relieved; and means at at least one working station, associated with said stationary yoke, providing locations for two injection units operating at right angles to each other.

2. In an injection mold locking unit, the improvement claimed in claim 1, in which said driving means comprises a rotary piston drive mounted on that surface of said stationary yoke remote from said turntable, coaxially with the turntable axis, and operably connected to said turntable.

3. In an injection mold locking unit, the improvement claimed in claim 2, in which said hydraulic pressure mechanism includes a piston selectively engageable with said turntable; said piston, responsive to release of the pressure in said hydraulic pressure mechanism, having a small clearance with the adjacent surface of said turntable.

4. In an injection mold locking unit, the improvement claimed in claim 2, including a rotary shaft mounting said turntable; a crossbar secured to that end of said shaft remote from said turntable; and parallel bars, parallel to the axis of said shaft, supporting said crossbar on said stationary yoke.

5. In an injection mold locking unit, the improvement claimed in claim 4, in which said hydraulic pressure mechanism is mounted on said rotary shaft.

6. In an injection mold locking unit, the improvement claimed in claim 5, including a central bearing bush mounted in said turntable coaxially with said rotary shaft; a radial bearing and an end thrust bearing disposed in engagement with said bearing bush and mounting said turntable on said rotary shaft; said spring means comprising a spring engaging the end of said rotary shaft adjacent said turntable and operable to bias said turntable a short distance away from the adjacent surface of said stationary yoke to provide a clearance between said turntable and said stationary yoke responsive to release of pressure in said pressure mechanism; said pressure mechanism including a pressure piston engageable with said turntable and said piston, responsive to release of pressure in said pressure mechanism, having a small clearance with said turntable; said rotary piston drive being operatively connected to said bearing bush.

7. In an injection mold locking unit, the improvement claimed in claim 2, including respective mold locking units operatively associated with said first and second working stations, said mold locking units being arranged symmetrically with respect to the axis of rotation of said turntable; said means providing locations for two injection units operating at right angles to each other being associated with both stationary yokes.

8. In an injection mold locking unit, the improvement claimed in claim 7, in which the direction of operation of said mold locking units and the axis of rotation of said turntable are oriented vertically.

9. In an injection mold locking unit, the improvement claimed in claim 7, in which the direction of operation of said mold locking units and the axis of rotation of said turntable are oriented horizontally.

* * * * *